United States Patent
Visco et al.

(10) Patent No.: US 7,858,223 B2
(45) Date of Patent: *Dec. 28, 2010

(54) ELECTROCHEMICAL DEVICE COMPONENT WITH PROTECTED ALKALI METAL ELECTRODE

(75) Inventors: Steven J. Visco, Berkeley, CA (US); Yevgeniy S. Nimon, Danville, CA (US); Bruce D. Katz, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/824,579

(22) Filed: Jun. 28, 2007

(65) Prior Publication Data

US 2008/0057387 A1 Mar. 6, 2008

Related U.S. Application Data

(63) Continuation of application No. 10/731,771, filed on Dec. 5, 2003, now Pat. No. 7,282,302, which is a continuation-in-part of application No. 10/686,189, filed on Oct. 14, 2003, now Pat. No. 7,282,296.

(60) Provisional application No. 60/418,899, filed on Oct. 15, 2002.

(51) Int. Cl.
*H01M 2/16* (2006.01)
*H01M 10/05* (2006.01)

(52) U.S. Cl. .................. 429/137; 429/144; 429/246

(58) Field of Classification Search ............ 429/137, 429/14, 231.95, 246, 144
See application file for complete search history.

(56) References Cited

U.S. PATENT DOCUMENTS

| 3,528,856 A | 9/1970 | Ovshinsky |
| 3,607,417 A | 9/1971 | McRae et al. |
| 3,615,835 A | 10/1971 | Ovshinsky |
| 3,625,769 A | 12/1971 | Lyall |

(Continued)

FOREIGN PATENT DOCUMENTS

EP 0111213 11/1983

(Continued)

OTHER PUBLICATIONS

EP patent application No. 04794699.1, examination report dated Aug. 5, 2008.

(Continued)

*Primary Examiner*—Gregg Cantelmo
(74) *Attorney, Agent, or Firm*—Weaver Austin Villeneuve & Sampson LLP

(57) ABSTRACT

Disclosed are ionically conductive composites for protection of active metal anodes and methods for their fabrication. The composites may be incorporated in active metal negative electrode (anode) structures and battery cells. In accordance with the invention, the properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

19 Claims, 12 Drawing Sheets

U.S. PATENT DOCUMENTS

| | | | |
|---|---|---|---|
| 3,703,415 A | 11/1972 | Mitoff et al. | |
| 3,912,536 A | 10/1975 | Galli et al. | |
| 3,976,509 A | 8/1976 | Tsai et al. | |
| 4,007,057 A | 2/1977 | Littauer et al. | |
| 4,091,182 A | 5/1978 | Farrington et al. | |
| 4,162,202 A | 7/1979 | Dey | |
| 4,163,084 A | 7/1979 | Tsai et al. | |
| 4,210,707 A | 7/1980 | Farrington | |
| 4,402,995 A | 9/1983 | Fleischer | |
| 4,405,416 A | 9/1983 | Raistrick et al. | |
| 4,414,293 A | 11/1983 | Joy et al. | |
| 4,504,561 A | 3/1985 | Winsel | |
| 4,833,048 A | 5/1989 | De Jonghe et al. | |
| 4,916,036 A | 4/1990 | Cheiky | |
| 4,917,974 A | 4/1990 | Visco et al. | |
| 4,981,672 A | 1/1991 | De Neufville et al. | |
| 4,985,317 A | 1/1991 | Adachi et al. | |
| 5,035,963 A | 7/1991 | Plichta | |
| 5,100,523 A | 3/1992 | Helms et al. | |
| 5,108,856 A | 4/1992 | Shuster | |
| 5,162,175 A | 11/1992 | De Jonghe et al. | |
| 5,166,011 A | 11/1992 | Rao et al. | |
| 5,198,081 A | 3/1993 | Kanoh et al. | |
| 5,213,908 A | 5/1993 | Hagedorn | |
| 5,314,765 A | 5/1994 | Bates | |
| 5,336,384 A | 8/1994 | Tsou et al. | |
| 5,338,625 A | 8/1994 | Bates et al. | |
| 5,342,710 A | 8/1994 | Koksbang | |
| 5,387,479 A | 2/1995 | Koksbang | |
| 5,409,786 A | 4/1995 | Bailey | |
| 5,427,873 A | 6/1995 | Shuster | |
| 5,455,126 A | 10/1995 | Bates et al. | |
| 5,506,068 A | 4/1996 | Dan et al. | |
| 5,510,209 A | 4/1996 | Abraham et al. | |
| 5,512,147 A | 4/1996 | Bates et al. | |
| 5,516,598 A | 5/1996 | Chu et al. | |
| 5,523,179 A | 6/1996 | Chu | |
| 5,525,442 A | 6/1996 | Shuster | |
| 5,532,077 A | 7/1996 | Chu | |
| 5,567,210 A | 10/1996 | Bates et al. | |
| 5,569,520 A | 10/1996 | Bates | |
| 5,582,623 A | 12/1996 | Chu | |
| 5,597,660 A | 1/1997 | Bates et al. | |
| 5,612,152 A | 3/1997 | Bates | |
| 5,648,187 A | 7/1997 | Skotheim | |
| 5,652,068 A | 7/1997 | Shuster et al. | |
| 5,665,481 A | 9/1997 | Shuster et al. | |
| 5,686,201 A | 11/1997 | Chu | |
| 5,696,201 A | 12/1997 | Cavalloni et al. | |
| 5,702,995 A | 12/1997 | Fu | |
| 5,814,420 A | 9/1998 | Chu | |
| 5,882,812 A | 3/1999 | De Jonghe et al. | |
| 5,961,672 A | 10/1999 | Skotheim et al. | |
| 6,017,651 A | 1/2000 | Chu et al. | |
| 6,025,094 A | 2/2000 | Visco et al. | |
| 6,030,720 A | 2/2000 | Chu et al. | |
| 6,030,909 A | 2/2000 | Fu | |
| 6,068,950 A | 5/2000 | Gan et al. | |
| 6,096,447 A | 8/2000 | Gan et al. | |
| 6,110,236 A | 8/2000 | Chu et al. | |
| 6,146,787 A | 11/2000 | Harrup et al. | |
| 6,165,644 A | 12/2000 | Chu et al. | |
| 6,183,901 B1 | 2/2001 | Ying et al. | |
| 6,198,701 B1 | 3/2001 | De Jonghe et al. | |
| 6,200,701 B1 | 3/2001 | Gan et al. | |
| 6,200,704 B1 | 3/2001 | De Jonghe et al. | |
| 6,203,942 B1 | 3/2001 | Gan et al. | |
| 6,210,832 B1 | 4/2001 | Chu et al. | |
| 6,214,061 B1 | 4/2001 | Visco et al. | |
| 6,225,002 B1 | 5/2001 | Chu et al. | |
| 6,228,527 B1 | 5/2001 | Medeiros et al. | |
| 6,248,481 B1 | 6/2001 | De Jonghe et al. | |
| 6,274,269 B1 | 8/2001 | Gan et al. | |
| 6,280,598 B1 | 8/2001 | Barton et al. | |
| 6,296,958 B1 | 10/2001 | Pinto et al. | |
| 6,315,881 B1 | 11/2001 | Fu | |
| 6,358,643 B1 | 3/2002 | Katz et al. | |
| 6,358,651 B1 | 3/2002 | Chen et al. | |
| 6,376,123 B1 | 4/2002 | Chu | |
| 6,391,492 B1 | 5/2002 | Kawakami et al. | |
| 6,402,795 B1 | 6/2002 | Chu et al. | |
| 6,413,284 B1 | 7/2002 | Chu et al. | |
| 6,413,285 B1 | 7/2002 | Chu et al. | |
| 6,432,584 B1 | 8/2002 | Visco et al. | |
| 6,475,677 B1 * | 11/2002 | Inda et al. | 429/304 |
| 6,485,622 B1 | 11/2002 | Fu | |
| 6,489,055 B1 | 12/2002 | Ichihashi et al. | |
| 6,495,285 B2 | 12/2002 | Gan et al. | |
| 6,511,772 B2 | 1/2003 | Gan et al. | |
| 6,537,698 B2 | 3/2003 | Gan et al. | |
| 6,537,701 B1 | 3/2003 | Chu et al. | |
| 6,632,573 B1 | 10/2003 | Nimon et al. | |
| 6,723,140 B2 | 4/2004 | Chu et al. | |
| 6,737,197 B2 | 5/2004 | Chu et al. | |
| 6,770,187 B1 | 8/2004 | Putter et al. | |
| 6,797,428 B1 | 9/2004 | Skotheim et al. | |
| 6,911,280 B1 | 6/2005 | De Jonghe et al. | |
| 6,955,866 B2 | 10/2005 | Nimon et al. | |
| 6,991,662 B2 | 1/2006 | Visco et al. | |
| 7,070,632 B1 | 7/2006 | Visco et al. | |
| 7,211,351 B2 | 5/2007 | Klaassen | |
| 7,211,532 B2 | 5/2007 | Fu | |
| 7,247,408 B2 | 7/2007 | Skotheim et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,344,804 B2 | 3/2008 | Klaassen | |
| 7,491,458 B2 | 2/2009 | Visco et al. | |
| 7,608,178 B2 | 10/2009 | De Jonghe et al. | |
| 7,645,543 B2 | 1/2010 | Visco et al. | |
| 7,666,233 B2 | 2/2010 | Visco et al. | |
| 2001/0028977 A1 | 10/2001 | Kazacos et al. | |
| 2002/0012845 A1 | 1/2002 | Choi et al. | |
| 2002/0068220 A1 | 6/2002 | Wyler | |
| 2002/0102465 A1 | 8/2002 | Chen et al. | |
| 2002/0106563 A1 | 8/2002 | Okawa | |
| 2003/0124433 A1 | 7/2003 | Kim et al. | |
| 2004/0185334 A1 | 9/2004 | Iwamoto | |
| 2004/0191617 A1 | 9/2004 | Visco et al. | |
| 2004/0197641 A1 | 10/2004 | Visco et al. | |
| 2005/0100792 A1 | 5/2005 | Visco et al. | |
| 2005/0100793 A1 | 5/2005 | Jonghe et al. | |
| 2005/0186469 A1 | 8/2005 | De Jonghe et al. | |
| 2005/0208353 A1 | 9/2005 | Johnson | |
| 2006/0063051 A1 | 3/2006 | Jang | |
| 2006/0078790 A1 | 4/2006 | Nimon et al. | |
| 2007/0087269 A1 | 4/2007 | Inda | |
| 2007/0117026 A1 | 5/2007 | Kumar et al. | |
| 2007/0259234 A1 | 11/2007 | Chua | |

FOREIGN PATENT DOCUMENTS

| | | |
|---|---|---|
| EP | 0111214 | 11/1983 |
| EP | 0 838 441 | 9/1998 |
| EP | 0875951 | 11/1998 |
| EP | 0689260 | 4/1999 |
| EP | 1 162 675 | 12/2001 |
| JP | 55081471 | 6/1980 |
| JP | 62-243247 | 10/1987 |
| JP | 09320645 | 12/1997 |
| WO | WO 99/57770 | 11/1999 |
| WO | WO 02/50933 | 6/2002 |
| WO | 2005/038953 | 4/2005 |

| WO | 2005/038962 | 4/2005 |

OTHER PUBLICATIONS

Gilman S., "Overview of Army Research Lab/SEDD Electrochemical Power R&D Program", $9^{th}$ Electrochemical Power Sources R&D Symposium, Jun. 2005.
Visco S.J. et al., "Stable, Reversible Li Metal Anodes Enabling Technology for Next Generation Batteries", $9^{th}$ Electrochemical Power Sources R&D Symposium, Jun. 2005.
Dai J. et al., "Li-air Rechargeable Cell for High Energy Applications", Proceeding of the $42^{nd}$ Power Sources Conference, Jun. 2006, p. 2.4.
WO patent application No. PCT/US06/48755, International Search Report dated Apr. 7, 2008.
WO patent application No. PCT/US06/48755, Written Opinion dated Apr. 7, 2008.
Foster D.L. et al., "Ceramic Membranes for Lithium Batteries", Proceeding of the $42^{nd}$ Power Sources Conference, Jun. 2006, p. 2.14.
Read J., "The Effect of Electrolyte Salt on Performance of the Lithium/Oxygen Battery", Proceeding of the $9^{th}$ Electrochemical Power Sources R&D Symposium, Jun. 2005.
Read J., "Electrolyte Formulation and Temperature Performance of the $Li/O_2$ Battery", Proceeding of the $9^{th}$ Electrochemical Power Sources R&D Sypmpsium, Jun. 2005.
Ogasawara T. et al., "Rechargeable $Li_2O_2$ Electrode for Lithium Batteries", J. Am. Chem. Soc., vol. 128, No. 4, 2006, pp. 1309-1393.
U.S. Appl. No. 10/825,587, Office Action mailed Jun. 5, 2008.
CN patent application No. 200480042697.3, Office Action mailed Feb. 15, 2008.
U.S. Appl. No. 11/245,472, Office Action mailed Jul. 24, 2008.
U.S. Appl. No. 10/772,157, Office Action mailed Jul. 11, 2008.
CN patent application No. 200480037293.5, Office Action mailed Aug. 22, 2008.
U.S. Appl. No. 10/825,587, Office Action mailed Oct. 16, 2008.
AU patent application No. 2003301383, Examination Report mailed Sep. 29, 2008.
U.S. Appl. No. 10/986,441, Office Action mailed Oct. 20, 2008.
U.S. Appl. No. 10/825,587, Notice of Allowance mailed Nov. 24, 2008.
U.S. Appl. No. 10/825,587, Allowed Claims.
Nippon Telegr & Teleph Corp., "Patent Abstracts of Japan," vol. 008, No. 119 (E-248), Jun. 5, 1984 & JP 59 031573 A, Feb. 20, 1984.
"R&D Thin Film Technology", Sep. 1997, *R&D Magazine*.
Steven D. Jones, et al., "Thin film rechargeable Li batteries", 1994, *Solid State Ionics*.
J.B. Bates, et al., "Thin-film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in $Li_2O$-$Al_2O_3$-$TiO_2$-$SiO_2$-$P_2O_5$ Glass-Ceramics", Journal of the American Ceramics Society, vol. 80, No. 7, Jul. 1997, pp. 1-5.
Aono et al., "Ionic Conductivity of the Lithium Titanium Phosphate $(Li_{1+x}M_xTi_{2-x}(PO_4)_3$, M=Al, Sc, Y, and La) Systems", Dept. of Industrial Chemistry, pp. 590-591.
Aono, Hiromichi, "High Li+ Conducting Ceramics", Acc. Chem. Res. vol. 27, No. 9, 1994, pp. 265-270.
Aono et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta$=$Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O$-$Al_2O_3$-$TiO_3$-$P_2O_5$", Solid State Ionics, 96 (1997), pp. 195-200.
Fu, Jie, "Fast Li+ ion conducting glass-ceramics in the system $Li_2O$-$Al_2O_3$-$GeO_2$-$P_2O_5$" Solid State Ionics 104 (1997), pp. 191-194.
Aono, et al., "DC Conductivity of $Li_{1.3}Al_{0.3}Ti_{1.7}(PO_4)_3$" Ceramic with Li Electrodes, Chemistry Letters, 1991, pp. 1567-1570.
Aono, et al., "Electrical Properties of Sintered Lithium Titanium Phosphate Ceramics ($Li_{1+x}M_xTi_{2+x}PO_4)_3,M^{3+}$=$Al^{3+},Sc^{3+}$, or $Y^{3+}$)", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Will, et al., "Primary Sodium Batteries with Beta-Alumina Solid Electrolyte", J. Electrochemical Science and Technology, Apr. 1975, vol. 122, No. 4, pp. 457-461.
European Examination Report dated Mar. 21, 2006 from related European Application No. 03809186.4.
International Search Report dated Mar. 6, 2006 from International Application No. PCT/US2004/033371.
International Search Report dated Mar. 6, 2006 from International Application No. PCT/US2004/033424.
Galbraith, A.D., "The lithium-water-air battery for automotive propulsion," XP002355800, Symp. Int. Veh. Electr., [RAPP.], $4^{th}$, vol. 1, Paper 32.4, 23 pp. publisher: Electr. Veh. Counc., 1976, Chemical Abstract Service.
West, et al., "Chemical stability enhancement of lithium conducting solid electrolyte plates using sputtered LiPON thin films," Journal of Power Sources, vol. 126, Issues 1-2, pp. 1-272 (Feb. 16, 2004).
International Search Report dated Oct. 18, 2005 from related International Application No. PCT/US2004/033372.
U.S. Office Action mailed Jun. 16, 2006, from U.S. Appl. No. 11/092,781.
International Search Report dated Jan. 16, 2006 from International Application No. PCT/US2004/033361.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic/polymer composite electrolyte", Solid State Ionics 152-153 (2002) 137-142.
Shuster, Nicholas, "LithiumWater Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of the Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).

Urquidi-Mcdonald, et al., "Lithium/poly(organophosphazene) membrane anodes in KOH and seawater", Electrochimica Acta 47, (2002), pp. 2495-2503.

Nimon et al., "Stability of Lithium Electrode in Contact with Glass Electrolytes", SSI-14, Jun. 22-27, 2003, Monterey, CA. (conference poster).

Nimon et al., "Stability of Lithium Electrode in Contact with Glass Electrolytes", SSI-14 Conference, Monterey, CA., Jun. 22, 2003, Abstract of Poster.

U.S. Office Action mailed Oct. 11, 2006, from U.S. Appl. No. 10/686,041.

China patent application No. 2003801061464, First Office Action mailed Oct. 27, 2006.

Thokchom, Joykumar S., et al., "Water Durable Lithium Ion Conducting Composite Membranes from the $Li_2O-Al_2O_3-TiO_2-P_2O_5$ Glass-Ceramic", *Journal of the Electrochemical Society*, 154 (4), 2007, pp. A331-A336.

U.S. Appl. No. 10/772,228, Office Action mailed Sep. 21, 2007.

U.S. Appl. No. 10/772,228, Notice of Allowance mailed Jan. 22, 2008.

U.S. Appl. No. 10/772,228, Allowed Claims.

U.S. Appl. No. 10/772,157, Office Action mailed Feb. 6, 2008.

U.S. Appl. No. 10/772,157, Office Action mailed Nov. 1, 2007.

U.S. Appl. No. 10/825,587, Office Action mailed Apr. 1, 2008.

CN patent application No. 200480042697.3, Office Action mailed Jun. 5, 2009.

U.S. Appl. No. 11/245,472, Office Action mailed Jul. 8, 2009.

AU patent application No. 2004306866, Exam Report mailed Apr. 9, 2009.

AU patent application No. 2004316638, Office Action mailed Aug. 3, 2009.

EP patent application No. 04794699.1, Notice of Allowance mailed Jun. 10, 2009.

U.S. Appl. No. 12/334,116, Office Action mailed Oct. 27, 2009.

EP patent application No. 03809186.4, Examination Report mailed Nov. 24, 2009.

U.S. Appl. No. 11/245,472, Office Action mailed Feb. 4, 2010.

U.S. Appl. No. 12/475,403, Office Action mailed Feb. 8, 2010.

CN patent application No. 200480037293.5, Office Action mailed Jan. 29, 2010.

EP patent application No. 04794655.3, Examination Report mailed Apr. 22, 2010.

CA patent application No. 2,502,438, Examination Report mailed May 12, 2010.

U.S. Appl. No. 10/772,157, Office Action mailed Dec. 30, 2008.

U.S. Appl. No. 11/824,574, Office Action mailed Dec. 31, 2008.

CN patent application No. 200480042697.3, Office Action mailed Dec. 19, 2008.

U.S. Appl. No. 11/245,472, Office Action mailed Jan. 8, 2009.

U.S. Appl. No. 11/824,548, Office Action mailed Jan. 26, 2009.

U.S. Appl. No. 11/823,847, Office Action mailed Apr. 28, 2009.

\* cited by examiner

ELECTROCHEMICAL DEVICE COMPONENT WITH PROTECTED ALKALI METAL ELECTRODE

CROSS-REFERENCE TO RELATED APPLICATIONS

This application is a continuation of U.S. patent application Ser. No. 10/731,771 filed Dec. 5, 2003, titled IONICALLY CONDUCTIVE COMPOSITES FOR PROTECTION OF ACTIVE METAL ANODES, now pending, which in turn is a continuation-in-part of U.S. patent application Ser. No. 10/686,189 filed Oct. 14, 2003, titled IONICALLY CONDUCTIVE COMPOSITES FOR PROTECTION OF ACTIVE METAL ANODES, now pending, which claims priority to U.S. Provisional Patent Application No. 60/418,899 filed Oct. 15, 2002, titled IONICALLY CONDUCTIVE COMPOSITES FOR PROTECTION OF ANODES AND ELECTROLYTES. These prior applications are incorporated herein by reference in their entirety for all purposes.

BACKGROUND OF THE INVENTION

1. Field of the Invention

The present invention relates generally to separators and electrode structures for use in batteries. More particularly, this invention relates composites for protection of active metal anodes from deleterious reaction with air, moisture and other battery components and methods for their fabrication.

2. Description of Related Art

The low equivalent weight of alkali metals, such as lithium, render them particularly attractive as a battery electrode component. Lithium provides greater energy per volume than the traditional battery standards, nickel and cadmium. Unfortunately, no rechargeable lithium metal batteries have yet succeeded in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits which can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte which contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various preformed lithium protective layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LiPON is a glassy single ion conductor (conducts lithium ion) which has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

Work in the present applicants' laboratories has developed technology for the use of glassy or amorphous protective layers, such as LiPON, in active metal battery electrodes. (See, for example, U.S. Pat. No. 6,025,094, issued Feb. 15, 2000, U.S. Pat. No. 6,402,795, issued Jun. 11, 2002, U.S. Pat. No. 6,214,061, issued Apr. 10, 2001 and U.S. Pat. No. 6,413,284, issued Jul. 2, 2002, all issued to Visco, et al. and assigned to at PolyPlus Battery Company). Despite this progress, alternative protective layers and structures that could also enhance active metal, particularly lithium metal, battery performance continue to be sought. In particular, protective layers that combine the characteristics of high ionic conductivity and chemical stability to materials and conditions on either side of the protective layer are desired.

SUMMARY OF THE INVENTION

The present invention provides ionically conductive composites for protection of anodes and electrolytes and methods for their fabrication. The composites may be incorporated in active metal negative electrode (anode) structures and battery cells. In accordance with the invention, the properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

The composite is composed of at least two components of different materials having different chemical compatibility requirements. The composite may be composed of a laminate of discrete layers of materials having different chemical compatibility requirements, or it may be composed of a gradual transition between layers of the materials. By "chemical compatibility" (or "chemically compatible") it is meant that the referenced material does not react to form a product that is deleterious to battery cell operation when contacted with one or more other referenced battery cell components or manufacturing, handling or storage conditions. A first material layer (or first layer material) of the composite is ionically conductive, and chemically compatible with an active metal electrode material. Chemical compatibility in this aspect of the invention refers both to a material that is chemically stable and therefore substantially unreactive when contacted with an active metal electrode material. It may also refer to a material that is chemically stable with air, to facilitate storage and handling, and reactive when contacted with an active metal electrode material to produce a product that is chemically stable against the active metal electrode material and has the desirable ionic conductivity (i.e., a first layer material). Such a reactive material is sometimes referred to as a "precursor" material. A second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

A wide variety of materials may be used in fabricating protective composites in accordance with the present invention, consistent with the principles described above. For example, the first layer, in contact with the active metal, may be composed, in whole or in part, of active metal nitrides, active metal phosphides, active metal halides or active metal phosphorus oxynitride-based glass. Specific examples include $Li_3N$, $Li_3P$, LiI, LiBr, LiCl, LiF and LiPON. Active metal electrode materials (e.g., lithium) may be applied to these materials, or they may be formed in situ by contacting precursors such as metal nitrides, metal phosphides, metal halides, red phosphorus, iodine, nitrogen or phosphorus containing organics and polymers, and the like with lithium. The in situ formation of the first layer may result from an incomplete conversion of the precursors to their lithiated analog. Nevertheless, such incomplete conversions meet the requirements of a first layer material for a protective composite in accordance with the present invention and are therefore within the scope of the invention.

A second layer of the protective composite may be composed of a material that is substantially impervious, ionically conductive and chemically compatible with the first material or precursor, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ ($0.6 \leq x \leq 0.9$) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | | mol % |
|---|---|---|
| $P_2O_5$ | | 26-55% |
| $SiO_2$ | | 0-15% |
| $GeO_2 + TiO_2$ | | 25-50% |
| in which | $GeO_2$ | 0-50% |
| | $TiO_2$ | 0-50% |
| $ZrO_2$ | | 0-10% |
| $M_2O_3$ | | 0-10% |
| $Al_2O_3$ | | 0-15% |
| $Ga_2O_3$ | | 0-15% |
| $Li_2O$ | | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or and $Li_{1+x+y}Q_xTi_{2-x}Si_yP_{3-y}O_{12}$ where $0<X \leq 0.4$ and $0<Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Either layer may also include additional components. For instance, a suitable active metal compatible layer (first layer) may include a polymer component to enhance its properties. For example, polymer-iodine complexes like poly(2-vinylpyridine)-iodine (P2VP-$I_2$), polyethylene-iodine, or with tetraalkylammonium-iodine complexes can react with Li to form a Liu-based film having significantly higher ionic conductivity than that for pure LiI. Also, a suitable first layer may include a material used to facilitate its use, for example, the residue of a wetting layer (e.g., Ag) used to prevent reaction between vapor phase lithium (during deposition) and LiPON when LiPON is used as a first layer material.

A suitable second layer may include a polymer component to enhance its properties. For example, a glass-ceramic active metal ion conductor, like the glass-ceramic materials described above, may also be combined with polymer electrolytes to form flexible composite sheets of material which may be used as second layer of the protective composite. One important example of such a flexible composite material has been developed by OHARA Corp. (Japan). It is composed of particles of a Li-ion conducting glass-ceramic material, such as described above, and a solid polymer electrolyte based on PEO—Li salt complexes. OHARA Corp. manufactures this material in the form of sheet with a thickness of about 50 microns that renders it flexible while maintaining its high ionic conductivity. Because of its relatively high ionic conductivity (better than $4*10^{-5}$ S/cm at room temperature in the case of the OHARA product) and stability toward metallic Li, this type of composite electrolyte can be used at room temperature or elevated temperatures in fully solid-state cells.

In addition, the layers may be formed using a variety of techniques. These include deposition or evaporation (including e-beam evaporation) of layers of material, such as $LiN_3$ or an ionically conductive glass. Also, as noted above, the active metal electrode adjacent layer may be formed in situ from the non-deleterious reaction of one or more precursors with the active metal electrode. For example, a $LiN_3$ layer may be formed on a Li anode by contacting $CuN_3$ with the Li anode surface, or $LiP_3$ may be formed on a Li anode by contacting red phosphorus with the Li anode surface.

The invention encompasses protected anode structures with fully-formed protective layers and battery separators incorporating ambient stable precursors, each of which may be handled or stored in normal ambient atmospheric conditions without degradation prior to incorporation into a battery cell. Battery cells and methods for making composites and battery cells are also provided.

These and other features of the invention will be further described and exemplified in the detailed description below.

DETAILED DESCRIPTION OF SPECIFIC EMBODIMENTS

Figure 1:
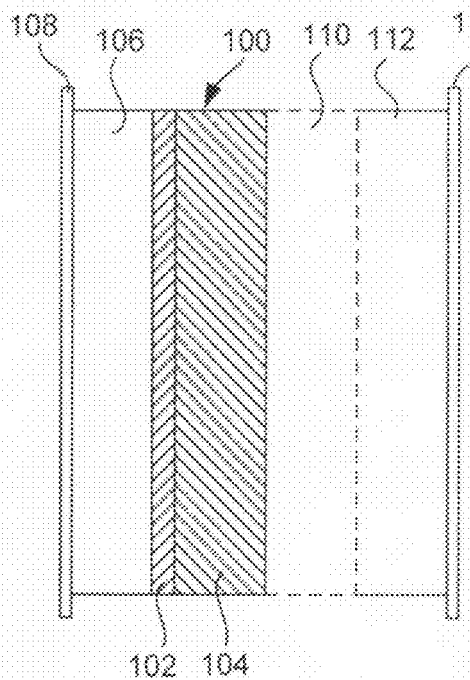
FIG. 1 is a schematic illustration of an active metal battery cell incorporating an ionically conductive protective composite in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

Ionically conductive composites for protection of anodes and electrolytes and methods for their fabrication. The composites may be incorporated in active metal negative electrode (anode) structures and battery cells. In accordance with the invention, the properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

The composite is composed of at least two components of different materials having different chemical compatibility requirements. The composite may be composed of a laminate of discrete layers of materials having different chemical compatibility requirements, or it may be composed of a gradual transition between layers of the materials. By "chemical compatibility" (or "chemically compatible") it is meant that the referenced material does not react to form a product that is deleterious to battery cell operation when contacted with one or more other referenced battery cell components or manufacturing, handling or storage conditions. A first material layer of the composite is both ionically conductive and chemically compatible with an active metal electrode material. Chemical compatibility in this aspect of the invention refers to a material that is chemically stable and therefore substantially unreactive when contacted with an active metal electrode material. Active metals are highly reactive in ambient conditions and can benefit from a barrier layer when used as electrodes. They are generally alkali metals such (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal electrode is composed of lithium. Chemical compatibility also refers to a material that may be chemically stable with oxidizing materials and reactive when contacted with an active metal electrode material to produce a product that is chemically stable against the active metal electrode material and has the desirable ionic conductivity (i.e., a first layer material). Such a reactive material is sometimes referred to as a "precursor" material.

A second material layer of the composite is substantially impervious, ionically conductive and chemically compatible with the first material. By substantially impervious it is meant that the material provides a sufficient barrier to battery electrolytes and solvents and other battery component materials that would be damaging to the electrode material to prevent any such damage that would degrade electrode performance from occurring. Thus, it should be non-swellable and free of pores, defects, and any pathways allowing air, moisture, electrolyte, etc. to penetrate though it to the first material. Preferably, the second material layer is so impervious to ambient moisture, carbon dioxide, oxygen, etc. that an encapsulated lithium alloy electrode can be handled under ambient conditions without the need for elaborate dry box conditions as typically employed to process other lithium electrodes. Because the composite protective layer described herein provides such good protection for the lithium (or other active metal), it is contemplated that electrodes and electrode/electrolyte composites of this invention may have a quite long shelf life outside of a battery. Thus, the invention contemplates not only batteries containing a negative electrode, but unused negative electrodes and electrode/electrolyte laminates themselves. Such negative electrodes and electrode/electrolyte laminates may be provided in the form of sheets, rolls, stacks, etc. Ultimately, they are integrated with other battery components to fabricate a battery. The enhanced stability of the batteries of this invention will greatly simplify this fabrication procedure.

In addition to the protective composite laminate structure described above, a protective composite in accordance with the present invention may alternatively be a functionally graded layer, as further described below.

It should be noted that the first and second materials are inherently ionically conductive. That is, they do not depend on the presence of a liquid electrolyte or other agent for their ionically conductive properties.

Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Protective Composites and Structures

FIG. 1 illustrates an ionically conductive protective composite in accordance with the present invention in context as it would be used in an active metal battery cell 120, such as a lithium-sulfur battery, in accordance with the present invention. The composite 100 is composed of a first layer 102 of a material that is both ionically conductive and chemically compatible with an active metal electrode material. The composite also includes second layer 104 of a material that is substantially impervious, ionically conductive and chemically compatible with the first material. The ionic conductivity of the composite is at least $10^{-7}$ S/cm, generally at least $10^{-6}$ S/cm, for example at least $10^{-5}$ S/cm to $10^{-4}$ S/cm, and as high as $10^{-3}$ S/cm or higher. The first layer 102 is adjacent to an active metal (e.g., lithium) anode 106. The active metal cathode 106 is connected with a current collector 108, composed of a conductive metal such as copper. On the other side of the composite 100, the second layer 104 is (optionally) in contact with an electrolyte 110. Alternatively, in some embodiments, the second layer 104 may itself be the sole electrolyte of the battery cell. Adjacent to the electrolyte is the cathode 112 with its current collector 114. Given the protection afforded by the protective composites of the present invention, the electrolytes and/or cathodes combined with the protected anodes of the present invention may include a wide variety of materials including, but not limited to, those described in the patents of PolyPlus Battery Company, referenced herein below.

Figure 2:
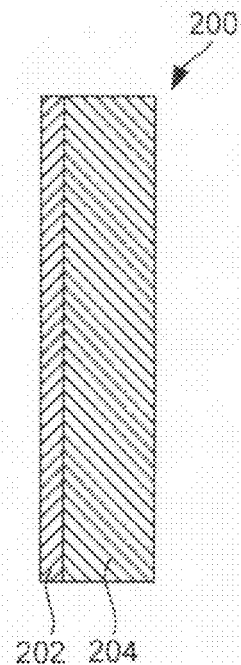
FIG. 2 is a schematic illustration of a protective composite battery separator in accordance with the present invention.

FIG. 2 illustrates a protective composite battery separator in accordance with the present invention. The separator 200 includes a layer of a first material or precursor 202 that is ionically conductive and chemically compatible with an active metal. In most cases, the first material is not chemically compatible with oxidizing materials (e.g., air, moisture, etc). The first layer, in contact with the active metal, may be composed, in whole or in part, of active metal nitrides, active metal phosphides, active metal halides or active metal phosphorus oxynitride-based glasses. Specific examples include $Li_3N$, $Li_3P$, LiI, LiBr, LiCl and LiF. In at least one instance, LiPON, the first material is chemically compatible with oxidizing materials. The thickness of the first material layer is preferably about 0.1 to 5 microns, or 0.2 to 1 micron, for example about 0.25 micron.

As noted above, the first material may also be a precursor material which is chemically compatible with an active metal and reactive when contacted with an active metal electrode material to produce a product that is chemically stable against the active metal electrode material and has the desirable ionic conductivity (i.e., a first layer material). Examples of suitable precursor materials include metal nitrides, red phosphorus, nitrogen and phosphorus containing organics (e.g., amines, phosphines, borazine ($B_3N_3H_6$), triazine ($C_3N_3H_3$)) and halides. Some specific examples include P (red phosphorus), $Cu_3N$, $SnN_x$, $Zn_3N_2$, $FeN_x$, $CoN_x$, aluminum nitride (AlN), silicon nitride ($Si_3N_4$) and $I_2$, $Br_2$, $Cl_2$ and $F_2$. Such precursor materials can subsequently react with active metal (e.g., Li) to form a Li metal salts, such as the lithium nitrides, phosphides and halides described above. In some instances, these first layer material precursors may also be chemically stable in air (including moisture and other materials normally present in ambient atmosphere), thus facilitating handling and fabrication. Examples include metal nitrides, for example $Cu_3N$.

Also, a suitable active metal compatible layer may include a polymer component to enhance its properties. For example, polymer-iodine complexes like poly(2-vinylpyridine)-iodine (P2VP-$I_2$), polyethylene-iodine, or with tetraalkylammonium-iodine complexes can react with Li to form a LiI-based film having significantly higher ionic conductivity than that for pure LiI.

The ionic conductivity of the first material is high, at least $10^{-7}$ S/cm, generally at least about $10^{-5}$ S/cm, and may be as high as $10^{-3}$ S/cm or higher.

Adjacent to the first material or precursor layer 202 is a second layer 204 that is substantially impervious, ionically conductive and chemically compatible with the first material or precursor, such as a phosphorus-based glass, oxide-based glass, phosphorus-oxynitride-based glass, sulpher-based glass, oxide/sulfide based glass, selenide based glass, gallium based glass, germanium-based glass, glass-ceramic active metal ion conductor, lithium beta-alumina, sodium beta-alumina, Li superionic conductor (LISICON), Na superionic conductor (NASICON), and the like. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ ($0.6 \leq x \leq 0.9$ and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$.

A particularly suitable glass-ceramic material for the second layer of the protective composite is a lithium ion conductive glass-ceramic having the following composition:

| Composition | | mol % |
|---|---|---|
| $P_2O_5$ | | 26-55% |
| $SiO_2$ | | 0-15% |
| $GeO_2 + TiO_2$ | | 25-50% |
| in which | $GeO_2$ | 0-50% |
| | $TiO_2$ | 0-50% |
| $ZrO_2$ | | 0-10% |
| $M_2O_3$ | | 0-10% |
| $Al_2O_3$ | | 0-15% |
| $Ga_2O_3$ | | 0-15% |
| $Li_2O$ | | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or and $Li_{1+x+y}Q_xTi_{2-x}Si_yP_{3-y}O_{12}$ where $0 < X \leq 0.4$ and $0 < Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

The high conductivity of some of these glasses and glass-ceramics (ionic conductivity in the range of about $10^{-5}$ to $10^{-3}$ S/cm or greater) may enhance performance of the protected lithium anode, and allow relatively thick films to be deposited without a large penalty in terms of ohmic resistance.

Also, a suitable second layer may include a polymer component to enhance its properties. For example, a glass-ceramic active metal ion conductor, like the glass-ceramic materials described above, may also be combined with polymer electrolytes to form flexible composite sheets of material which may be used as second layer of the protective composite. One important example of such a flexible composite material has been developed by OHARA Corp. (Japan). It is composed of particles of a Li-ion conducting glass-ceramic material, such as described above, and a solid polymer electrolyte based on PEO—Li salt complexes. OHARA Corp. manufactures this material in the form of sheet with a thickness of about 50 microns that renders it flexible while maintaining its high ionic conductivity. Because of its relatively high ionic conductivity (better than $4*10^{-5}$ S/cm at room temperature in the case of the OHARA product) and stability toward metallic Li, this type of composite electrolyte can be used at room temperature or elevated temperatures in fully solid-state cells.

The composite barrier layer should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode with which the separator is to be used. For example, the first material layer may have a thickness of about 0.1 to 5 microns; 0.2 to 1 micron; or about 0.25 micron.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example 20 microns.

When the first material layer is a precursor material chemically stable in air, for example $Cu_3N$ or LiPON, the protective composite battery separator may be handled or stored in normal ambient atmospheric conditions without degradation prior to incorporation into a battery cell. When the separator is incorporated into a battery cell, the precursor layer 202 is contacted with an active metal (e.g., lithium) electrode. The precursor reacts with the active metal to form an ionically conductive material that is chemically compatible with the active metal electrode material. The second layer is contacted with an electrolyte to which a cathode and current collector is or has been applied. Alternatively, the second layer acts as the sole electrolyte in the battery cell. In either case, the combination of the two layers in the protective composite protects the active metal electrode and the electrolyte and/or cathode from deleterious reaction with one another.

Figure 3A:
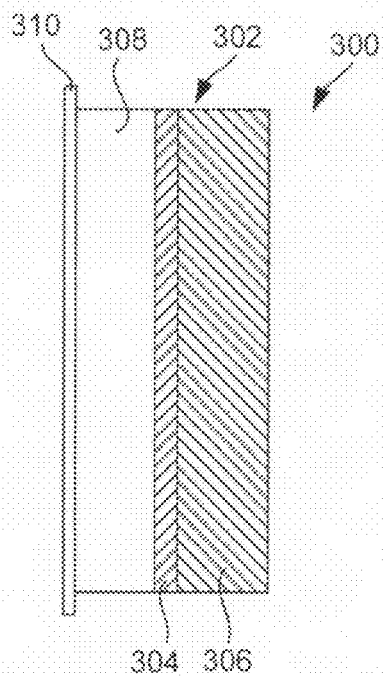
FIG. 3A is a schematic illustration of an active metal anode structure incorporating an ionically conductive protective laminate composite in accordance with the present invention.

FIG. 3A illustrates an encapsulated anode structure incorporating a protective laminate composite in accordance with the present invention. The structure 300 includes an active metal electrode 308, e.g., lithium, bonded with a current collector 310, e.g., copper, and a protective composite 302. The protective composite 302 is composed of a first layer 304 of a material that is both ionically conductive and chemically compatible with an active metal electrode material, but not chemically compatible with oxidizing materials (e.g., air). For example, the first layer, in contact with the active metal, may be composed, in whole or in part, of active metal nitrides, active metal phosphides or active metal halides. Specific examples include $Li_3N$, $Li_3P$, LiI, LiBr, LiCl and LiF. The thickness of the first material layer is preferably about 0.1 to 5 microns, or 0.2 to 1 micron, for example about 0.25 micron.

Active metal electrode materials (e.g., lithium) may be applied to these materials, or they may be formed in situ by contacting precursors such as metal nitrides, metal phosphides, metal halides, red phosphorus, iodine and the like with lithium. The in situ formation of the first layer may be by way of conversion of the precursors to a lithiated analog, for example, according to reactions of the following type (using P, $CuN_3$, and $PbI_2$ precursors as examples):

1. $3Li+P=Li_3P$ (reaction of the precursor to form Li-ion conductor);
2(a). $3Li+Cu_3N=Li_3N+3$ Cu (reaction to form Li-ion conductor/metal composite);
2(b). $2Li+PbI_2=2$ LiI+Pb (reaction to form Li-ion conductor/metal composite).

First layer composites, which may include electronically conductive metal particles, formed as a result of in situ conversions meet the requirements of a first layer material for a protective composite in accordance with the present invention and are therefore within the scope of the invention.

A second layer 306 of the protective composite is composed of a substantially impervious, ionically conductive and chemically compatible with the first material or precursor, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2)_3$, $Na_2O.11Al_2O_3$, $(Na, Li)_{1+x}Ti_{2-x}Al_x(PO_4)_3$ $(0.6 \leq x \leq 0.9)$ and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes. Suitable glass-ceramic ion active metal ion conductors are described, for example, in U.S. Pat. Nos. 5,702,995, 6,030,909, 6,315,881 and 6,485,622, previously incorporated herein by reference and are available from OHARA Corporation, Japan.

The ionic conductivity of the composite is at least $10^{-7}$ S/cm, generally at least $10^{-6}$ S/cm, for example at least $10^{-5}$ S/cm to $10^{-4}$ S/cm, and as high as $10^{-3}$ S/cm or higher. The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, 10 to 1000 microns, preferably between 1 and 500 micron, and more preferably between 10 and 100 microns, for example 20 microns.

When the anode structure is incorporated in a battery cell, the first layer 304 is adjacent to an active metal (e.g., lithium) anode and the second layer 306 is adjacent to an electrolyte or, where the second layer is the sole electrolyte in the battery cell, a cathode.

Either layer may also include additional components. For instance, a suitable first active metal compatible layer 304 may include a polymer component to enhance its properties. For example, polymer-iodine complexes like poly(2-vinylpyridine)-iodine ($P2VP-I_2$), polyethylene-iodine, or with tetraalkylammonium-iodine can react with Li to form a Liubased film having significantly higher ionic conductivity than that for pure LiI. Also, a suitable second layer 306 may include a polymer component to enhance its properties. For example, a glass-ceramic active metal ion conductor like that available from OHARA Corporation, described above, may be fabricated within a polymer matrix that renders it flexible while maintaining its high ionic conductivity (available from OHARA Corporation, Japan).

In addition, the layers may be formed using a variety of techniques. These include deposition or evaporation (including e-beam evaporation) of layers of material, such as $LiN_3$ or an ionically conductive glass. Also, as noted above, the active metal electrode adjacent layer may be formed in situ from the non-deleterious reaction of one or more precursors with the active metal electrode. For example, a $LiN_3$ layer may be formed on a Li anode by contacting $CuN_3$ with the Li anode surface, or $LiP_3$ may be formed on a Li anode by contacting red phosphorus with the Li anode surface.

Figure 3B:
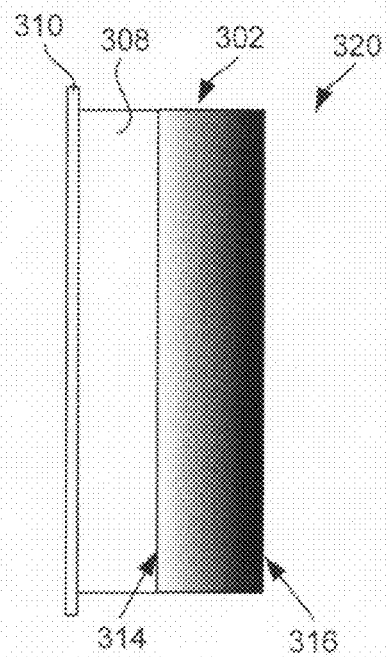
FIG. 3B is a schematic illustration of an active metal anode structure incorporating an ionically conductive protective graded composite in accordance with the present invention.

In addition to the protective composite laminates described above, a protective composite in accordance with the present invention may alternatively be compositionally and functionally graded, as illustrated in FIG. 3B. Through the use of appropriate deposition technology such as RF sputter deposition, electron beam deposition, thermal spray deposition, and or plasma spray deposition, it is possible to use multiple sources to lay down a graded film. In this way, the discrete interface between layers of distinct composition and functional character is replaced by a gradual transition of from one layer to the other. The result, as with the discrete layer composites described above, is a bi-functionally compatible ionically conductive composite 320 stable on one side 314 to lithium or other active metal (first material), and on the other side 316 substantially impervious and stable to the cathode, other battery cell components and preferably to ambient conditions (second material). In this embodiment, the proportion of the first material to the second material in the composite may vary widely based on ionic conductivity and mechanical strength issues, for example. In many, but not all, embodiments the second material will dominate. For example, suitable ratios of first to second materials may be 1-1000 or 1-500, for example about 1 to 200 where the second material has greater strength and ionic conductivity than the first (e.g., 2000 Å of LiPON and 20-30 microns of OHARA glass-ceramic). The transition between materials may occur over any (e.g., relatively short, long or intermediate) distance in the composite. Other aspects of the invention apply to these graded protective composites substantially as to the laminate protective composites, for example, they may be used in the separator and cell embodiments, etc.

Also, an approach may be used where a first material and second material are coated with another material such as a transient and/or wetting layer. For example, an OHARA glass ceramic plate is coated with a LiPON layer, followed by a thin silver (Ag) coating. When lithium is evaporated onto this structure, the Ag is converted to Ag—Li and diffuses, at least in part, into the greater mass of deposited lithium, and a protected lithium electrode is created. The thin Ag coating prevents the hot (vapor phase) lithium from contacting and adversely reaction with the LiPON first material layer. After deposition, the solid phase lithium is stable against the LiPON. A multitude of such transient/wetting (e.g., Sn) and first layer material combinations can be used to achieve the desired result.

Thus, the invention encompasses protected anode structures with fully-formed protective layers and battery separators incorporating ambient stable precursors, each of which may be handled or stored in normal ambient atmospheric conditions without degradation prior to incorporation into a battery cell. Battery cells and methods for making separators, anode structures and battery cells are also provided.

Fabrication Techniques

Materials and techniques for fabrication of active metal battery cells are described, for example, in U.S. Pat. No. 5,686,201 issued to Chu on Nov. 11, 1997. Further description of materials and techniques for fabrication of active metal battery cells having anode protective layers are described, for example, in U.S. patent application Ser. No. 09/139,601, filed Aug. 25, 1998 (now U.S. Pat. No. 6,214,061, issued Apr. 10, 2001), titled ENCAPSULATED LITHIUM ALLOY ELECTRODES HAVING BARRIER LAYERS, and naming May-Ying Chu, Steven J. Visco and Lutgard C. DeJonge as inventors; U.S. patent application Ser. No. 09/086,665 filed May 29, 1998 (now U.S. Pat. No. 6,025,094, issued May 15, 2000), titled PROTECTIVE COATINGS FOR NEGATIVE ELECTRODES, and naming Steven J. Visco and May-Ying Chu as inventors; U.S. patent application Ser. No. 09/139,603 filed Aug. 25, 1998 (now U.S. Pat. No. 6,402,795, issued Jun. 11, 2002), titled "PLATING METAL NEGATIVE ELECTRODES UNDER PROTECTIVE COATINGS," and naming May-Ying Chu, Steven J. Visco and Lutgard C. DeJonghe as inventors; U.S. patent application Ser. No. 09/139,601 filed Aug. 25, 1998 (now U.S. Pat. No. 6,214,061, issued Apr. 10, 2001), titled "METHOD FOR FORMING ENCAPSULATED LITHIUM ELECTRODES HAVING GLASS PROTECTIVE LAYERS," and naming Steven J. Visco and Floris Y. Tsang as inventors. The active metal electrode may also be an active metal alloy electrode, as further described in U.S. patent application Ser. No. 10/189,908 filed Jul. 3, 2002, titled "ENCAPSULATED ALLOY ELECTRODES," and naming Steven J. Visco, Yevgeniy S. Nimon and Bruce D. Katz as inventors. The battery component materials, including anodes, cathodes, separators, protective layers, etc., and techniques disclosed therein are generally applicable to the present invention and each of these patent applications is incorporated herein by reference in its entirety for all purposes.

In particular, a protective composite in accordance with the present invention may be formed using a variety of methods. These include deposition or evaporation (including e-beam evaporation) of the first layer of material or precursor on the second layer of material. Also, as noted above and described further below, the first layer may be formed in situ from the non-deleterious reaction of one or more precursors with an active metal electrode or material, by deposition or evaporation of lithium on the precursor, by direct contact of the precursor with a lithium metal (e.g., foil), or by plating of the precursor with lithium through a second layer material. In some embodiments, the second layer material may also be formed on the first layer material, as described further below.

Figure 4A:
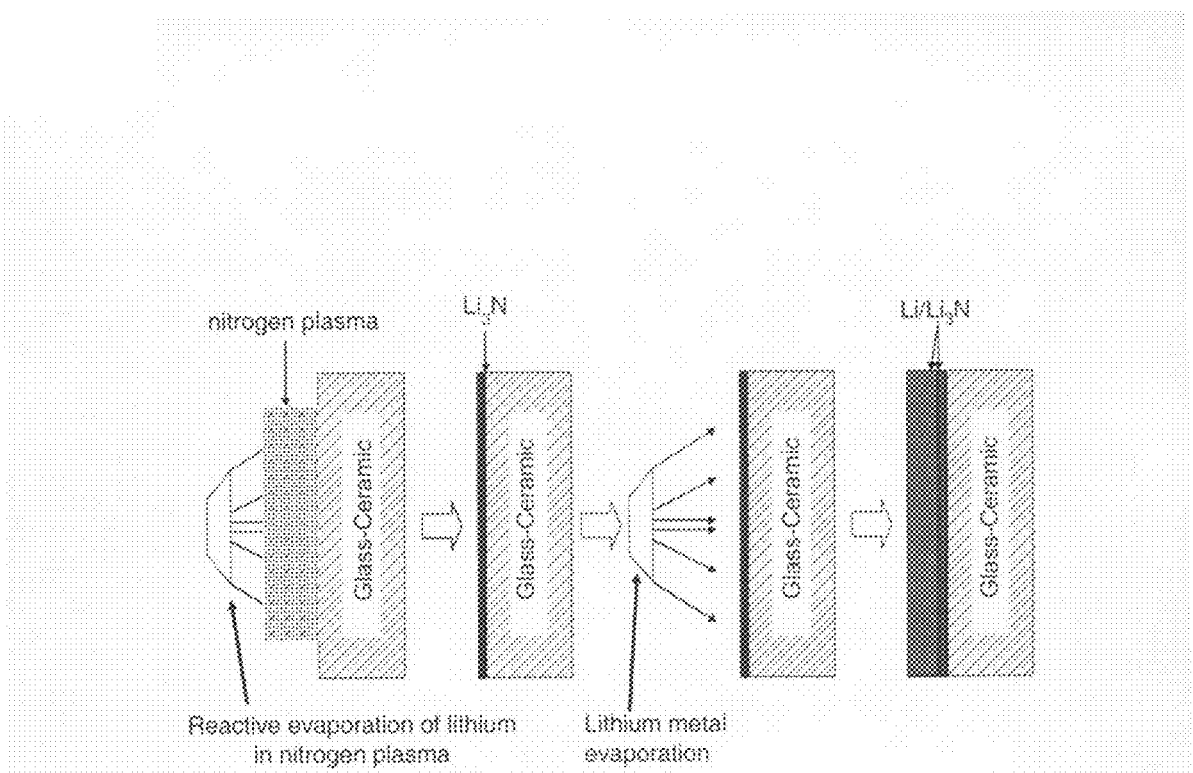
FIGS. 4A-C, 5 and 6A-B are schematic illustrations of alternative methods of making an electrochemical device structure incorporating an ionically conductive protective composite in accordance with the present invention.

Referring to FIG. 4A, a first method for forming a protective composite in accordance with the present invention is shown. A first layer, that is a highly ionically conductive active metal chemically compatible material, is directly deposited onto a second layer material, that is a substantially impervious, ionically conductive material, for example, a highly ionically conductive glass or glass-ceramic material such as LiPON or an OHARA glass-ceramic material described above. This can be done by a variety of techniques including RF sputtering, e-beam evaporation, thermal evaporation, or reactive thermal or e-beam evaporation, for example. In the particular example illustrated in the figure, lithium is evaporated in a nitrogen plasma to form a lithium nitride ($Li_3N$) layer on the surface of a glass-ceramic material such as the OHARA material described above. This is followed by evaporation of lithium metal onto the $Li_3N$ film. The $Li_3N$ layer separates the lithium metal electrode from the second material layer, but allows Li ions to pass from the Li electrode through the glass. Of course, other active metal, and first and second layer materials, as described herein, may be used as well.

Figure 4B:
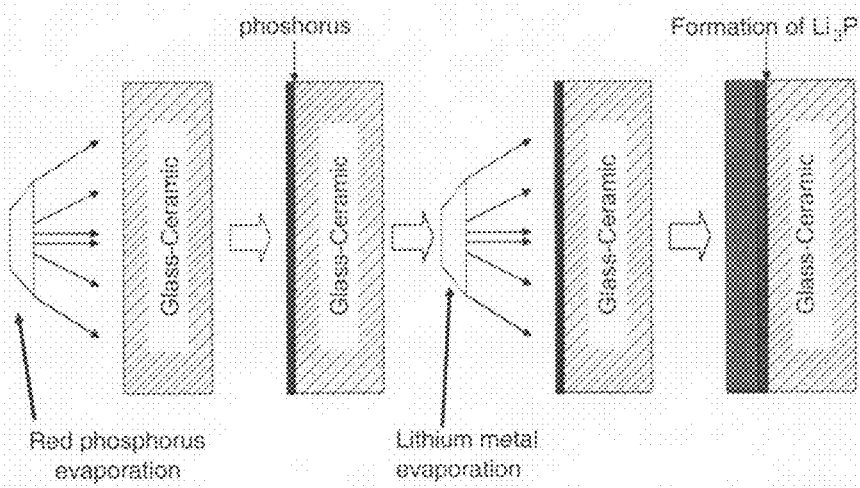

Alternatively, referring to FIG. 4B, a second method for forming a protective composite in accordance with the present invention is shown. The ionically conductive chemically compatible first layer material is formed in situ following formation of a precursor layer on the second layer material. In the particular example illustrated in the figure, a surface of a glass-ceramic layer, for example one composed of the OHARA material described above, is coated with red phosphorus, a precursor for an active metal (in this case lithium) phosphide. Then a layer of lithium metal is deposited onto the phosphorus. The reaction of lithium and phosphorus forms $Li_3P$ according to the following reaction: $3Li+P=Li_3P$. $Li_3P$ is an ionically conductive material that is chemically compatible with both the lithium anode and the glass-ceramic material. In this way, the glass-ceramic (or other second layer material) is not in direct contact with the lithium electrode. Of course, other active metal, first layer precursor and second layer materials, as described herein, may be used as well. Alternative precursor examples include $CuN_3$, which may be formed as a thin layer on a second layer material (e.g., glass-ceramic) and contacted with a Li anode in a similar manner according to the following reaction: $3Li+Cu_3N=Li_3N+3$ Cu; or lead iodide which may be formed as a thin layer on a polymer electrolyte and contacted with a Li anode in a similar manner according to the following reaction: $2Li+PbI_2=2$ LiI+ Pb.

Figure 4C:
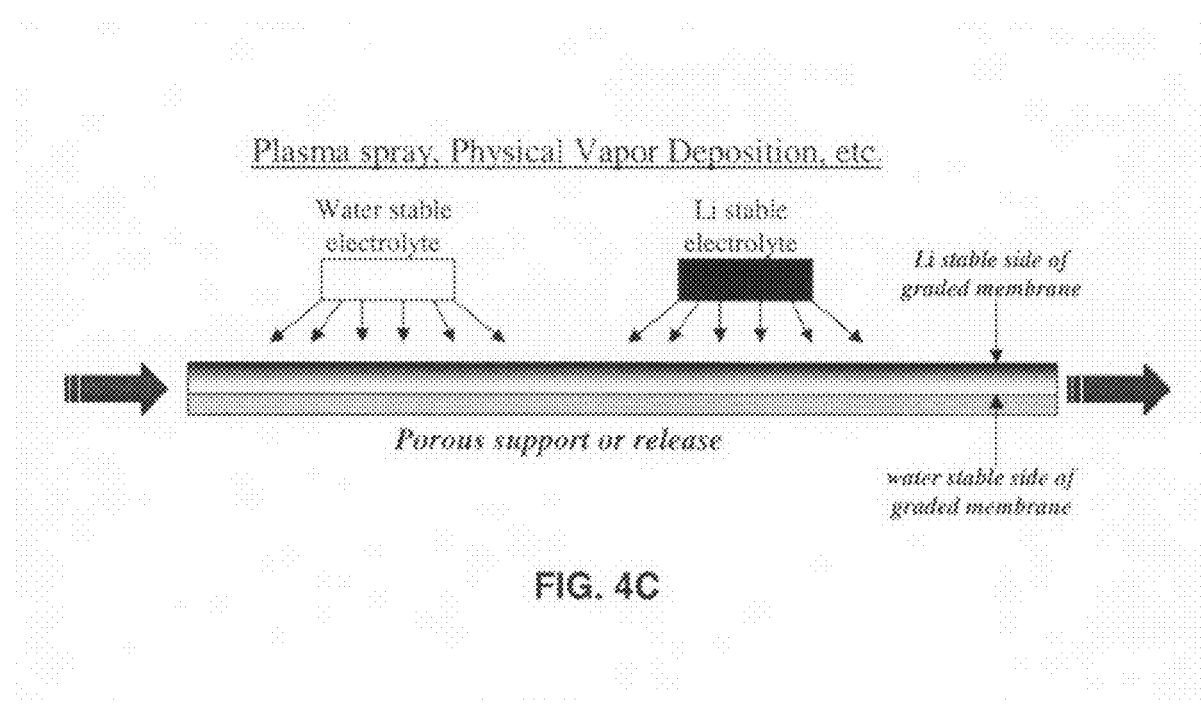

In another alternative, illustrated in FIG. 4C, a protective composite in accordance with the present invention may alternatively be compositionally and functionally graded so that there is a gradual transition of from one layer to the other. For example, a plasma spray operation with two spray heads, one for the deposition of a first component material, such as $Li_3N$, $Cu_3N$, $Li_3P$, LiPON, or other appropriate material, and the other for the deposition of a second component material, such as an OHARA glass-ceramic, may be used. The first plasma spray process begins laying down a layer of pure glass-ceramic material, followed by a gradual decrease in flow as the second plasma spray torch is gradually turned on, such that there is a gradient from pure glass-ceramic to a continuous transition from glass-ceramic to pure LiPON or $Li_3N$, etc. In this way, one side of the membrane is stable to active metal (e.g., lithium, sodium, etc.) and the other side is substantially impervious and stable to the cathode, other battery cell components and preferably to ambient conditions. Electron beam deposition or thermal spray deposition may also be used. Given the parameters described herein, one or skill in the art will be able to use any of these techniques to form the graded composites of the invention.

To form a protected anode, lithium is then bonded to the graded membrane on the first layer material (stable to active metal) side of the graded protective composite, for example by evaporation of lithium onto the protective composite as described above. It may also be desirable to add a bonding layer on top of the lithium stable side of the graded composite protective layer, such as Sn, Ag, Al, etc., before applying lithium.

In either of the forgoing methods described with reference to FIGS. 4A-C, rather than forming a lithium (or other active metal) layer on the first layer material or precursor, the first layer material or precursor of the protective composite may be contacted with the lithium by bonding metallic lithium to the protective interlayer material or precursor, for example by direct contact with extruded lithium metal foil. One embodiment of this alternative is illustrated for either of the FIG. 4A or FIG. 4B methods in FIG. 5.

In a further embodiment, a suitable substrate, e.g., having a wetting layer, such as a film of tin on copper, may be coated with a first layer material precursor, e.g., $Cu_3N$. This may then be coated with a second layer material, e.g., a (ionically) conductive glass. An active metal electrode may then be formed by plating the tin electrode with lithium (or other active metal), through the first and second layer materials. The $Cu_3N$ precursor is also converted to $Li_3N$ by this operation to complete the protective composite in accordance with the present invention on a lithium metal electrode. Details of an active metal plating process are described in commonly assigned U.S. Pat. No. 6,402,795, previously incorporated by reference.

Figure 5:
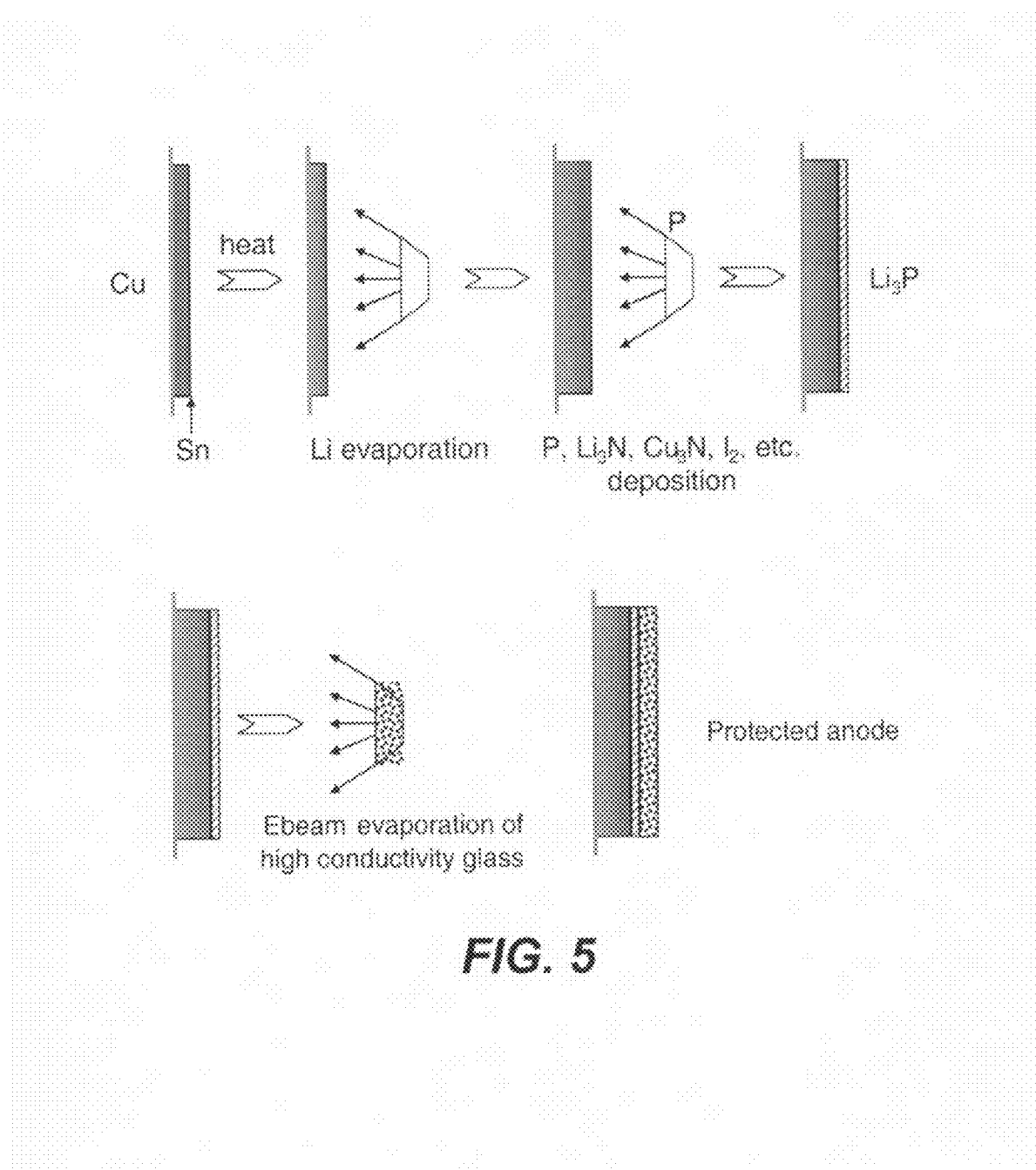

Also, in either of the methods illustrated in FIG. 4A or 4B, rather than forming a lithium (or other active metal) layer on the first layer material or precursor, the first layer material or precursor of the protective composite may be deposited (or otherwise formed) on lithium or other active metal material. Then, a second later material may be formed, for example by evaporation of a high conductivity glass, on the first layer material. One embodiment of this alternative is illustrated in FIG. 5 in which the active metal electrode is formed by evaporating lithium onto a pre-formed copper-tin (Cu—Sn) alloy to form a pre-expanded Li—Cu—Sn alloy anode as a substrate for the first and second layer materials forming the protective composite.

Also as noted above, in an alternative embodiment of the invention the first layer may include additional components. For instance, a suitable first layer may include a polymer component to enhance its properties. For example, polymer-iodine complexes like poly(2-vinylpyridine)-iodine (P2VP-$I_2$), polyethylene-iodine, or tetraalkylammonium-iodine can react with Li to form an ionically conductive LiI-based film that is chemically compatible with both an active metal and a second layer material as described herein. Without intending to be bound by theory, it is expected that the use of polymer-iodine charge transfer complexes can lead to formation of composites containing LiI and polymer and having significantly higher ionic conductivity than that for pure LiI. Other halogens may also be used in this manner, for example in bromine complexes.

Figure 6A:
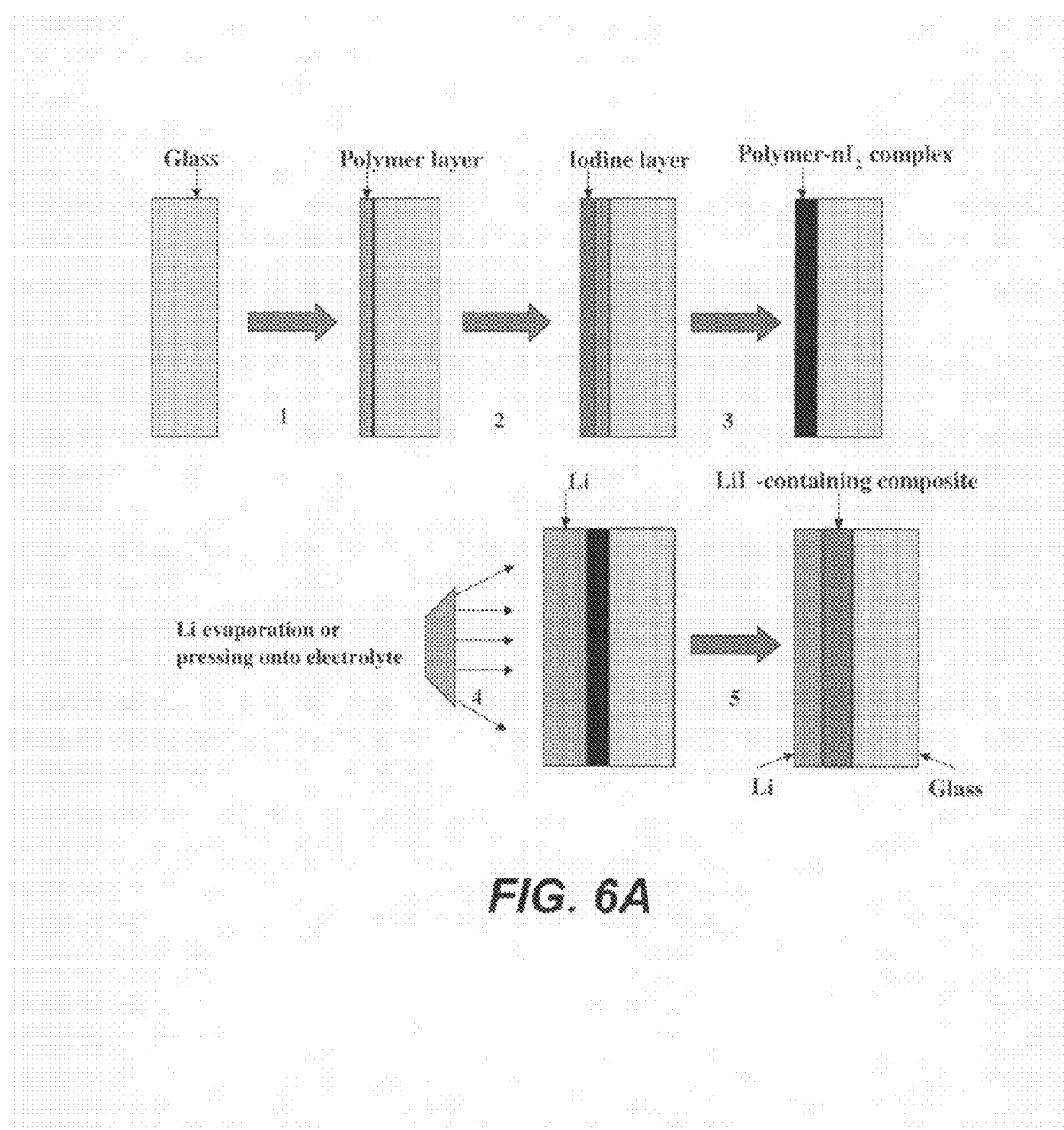

Referring to FIG. 6A, a first embodiment of this aspect of the present invention is shown. A polymer layer and a layer of iodine are coated on a second layer material surface and allowed to react forming polymer-iodine complex.

According to this method, a thin layer of polymer may be applied to the second material layer (e.g., conductive glass) using brushing, dipping, or spraying. For example, a conductive glass layer may be coated with a thin (e.g, 0.5 to 2.0 micron, preferably 0.1 to 0.5 micron) layer of P2VP in this way.

One technique for applying an iodine coating is sublimation of crystalline iodine that can be achieved at room temperature (e.g., about 20 to 25° C.) in a reactor placed in the dry box or in a dry room. A sublimed layer of iodine can be made very thin (e.g., 0.05 to 1.0 microns and the rate of sublimation can be adjusted by varying the temperature or distance between the substrate and source of iodine.

Alternatively, high concentrations (e.g., 50 to 100 g/liter of iodine can be dissolved in an organic solvent, such as acetonitrile and n-heptane. Dissolved iodine can be coated on the conductive glass surface by such methods as dip coating, spraying or brushing, among others. In this case, treatment conditions can be easily changed by varying the length of coating treatment and iodine concentrations. Examples of iodine sources for this technique include metal iodides are AgI and PbI$_2$, which are known to be used as the cathode materials in solid-state batteries with Li anode and LiU-based solid electrolyte.

Then, lithium (or other active metal) is contacted with the polymer-iodine complex on the conductive glass (or other second layer material), for example by evaporation or pressing onto the glass coated with this complex. The result is a LiI-containing composite protective barrier layer on the Li anode.

Figure 6B:
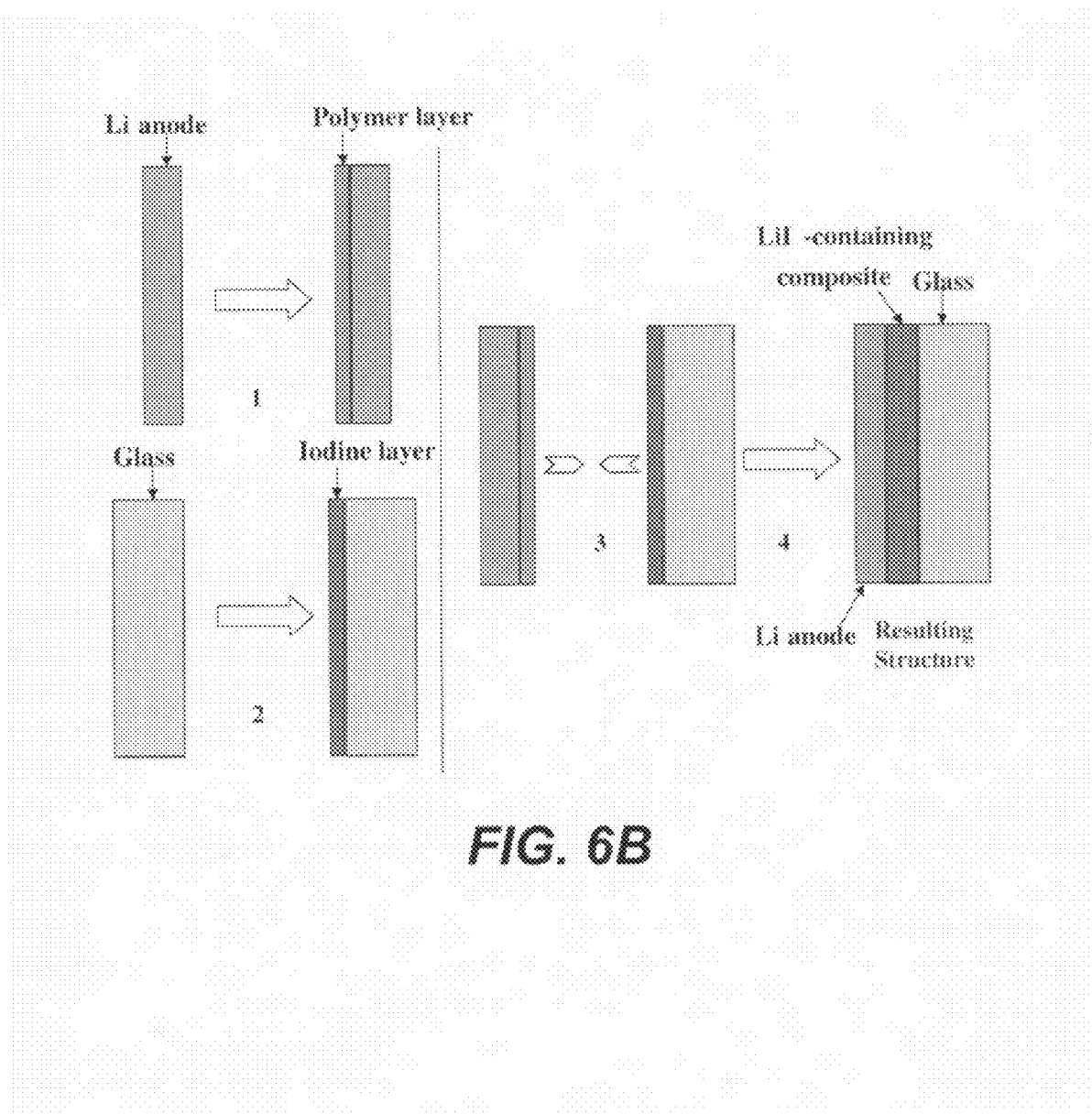

Referring to FIG. 6B, an alternative embodiment of this aspect of the present invention is shown. A conductive glass (or other second layer material) surface is coated with a thin layer of iodine, such as by a technique described above, that can react with Li forming LiI layer (A).

Active metal, for example lithium foil, can be coated with a thin layer of polymer (B), for example as described above, and then contacted with the iodine layer on the glass. After assembly, iodine reacts with the polymer layer and, as a result, LiI-containing composite protective barrier layer with reduced impedance is formed.

EXAMPLES

The following examples provide details illustrating advantageous properties, in particular very low impedance, of composite protective structures in accordance with the present invention on lithium electrodes. These examples are provided to exemplify and more clearly illustrate aspects of the present invention and are in no way intended to be limiting.

Example 1

Impedance Measurements Using LIPON in Composite Protective Layer

Figure 7A:
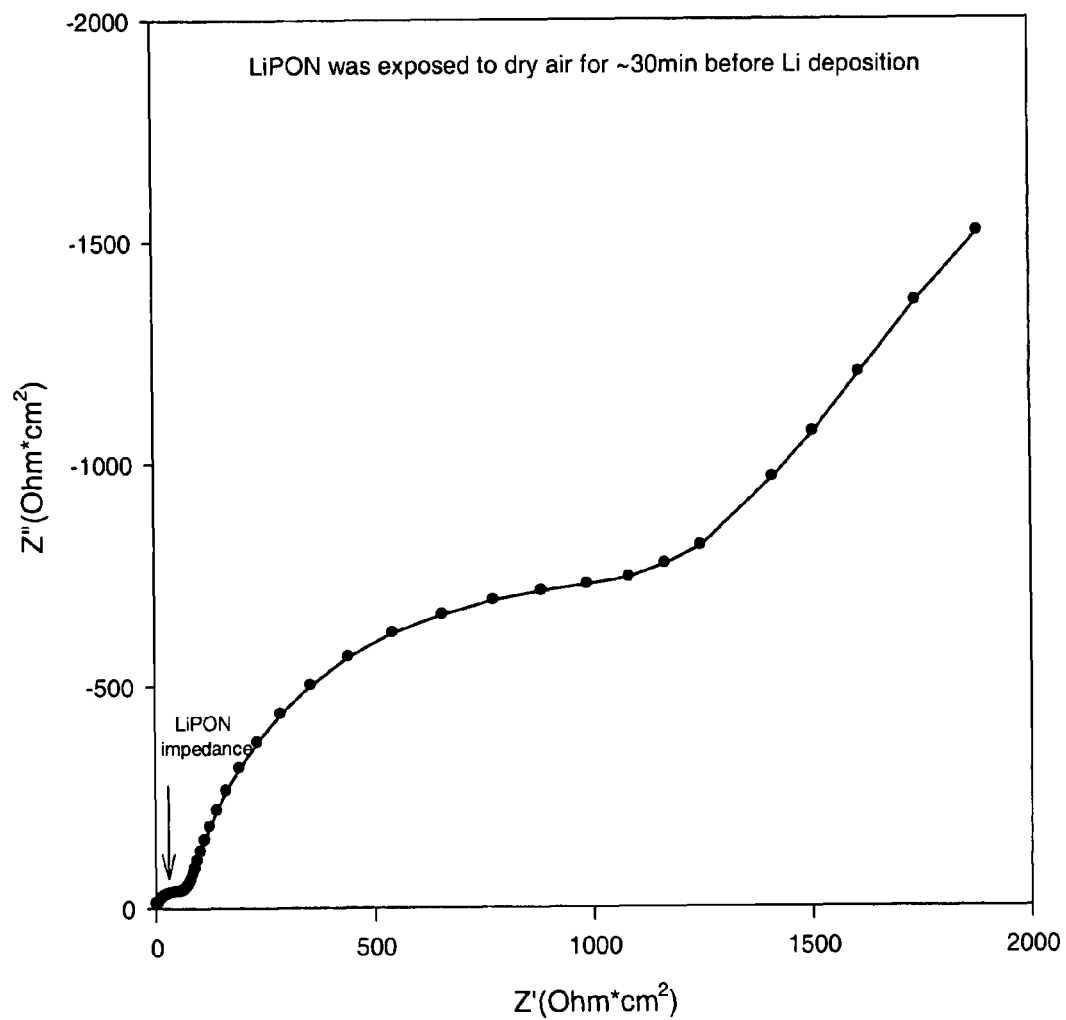
FIGS. 7A-B and 8A-D are plots of data illustrating the performance benefits of ionically conductive protective composites in accordance with the present invention.
Figure 7B:
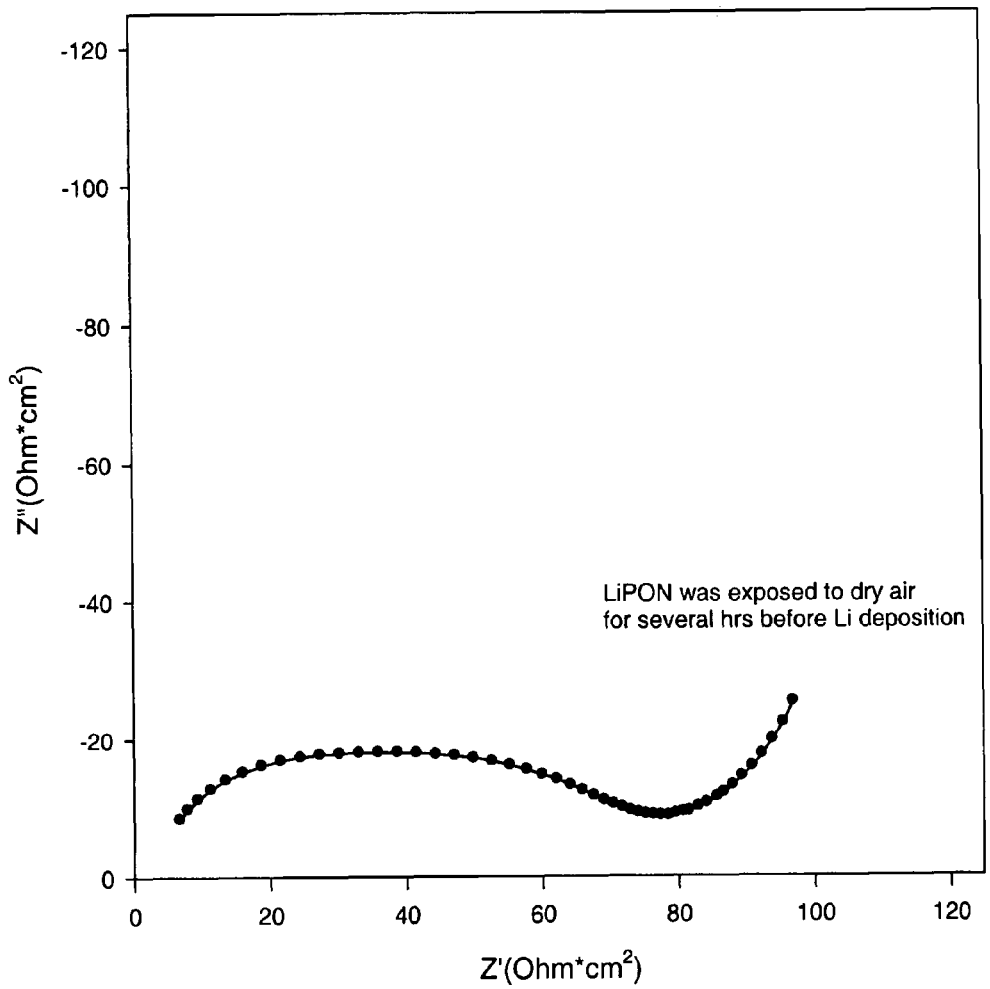

Approximately 0.75 microns of LiPON was RF sputter-deposited onto copper foil samples in a MRC 8671 Sputter Deposition system. Some of the copper foil samples were coated with an additional layer of Cu$_3$N (approximately 0.9 microns) by RF Magnetron sputtering of a copper target in a nitrogen environment. One LiPON/Cu sample was transferred to a vacuum evaporator, and approximately 3 to 7 microns of lithium metal was evaporated directly onto the LiPON surface. Another Cu$_3$N/LiPON/Cu sample was coated with a similar thickness of lithium. The impedance for the unprotected LiPON/Cu sample is shown in FIG. 7A; the evaporation of lithium onto the LiPON surface led to a dramatic rise in the resistance of the sample, which is undesirable for electrochemical devices. The beneficial effects of the protective Cu$_3$N film is seen in FIG. 7B; the impedance is dramatically lower in this case.

Example 2

Figure 8A:
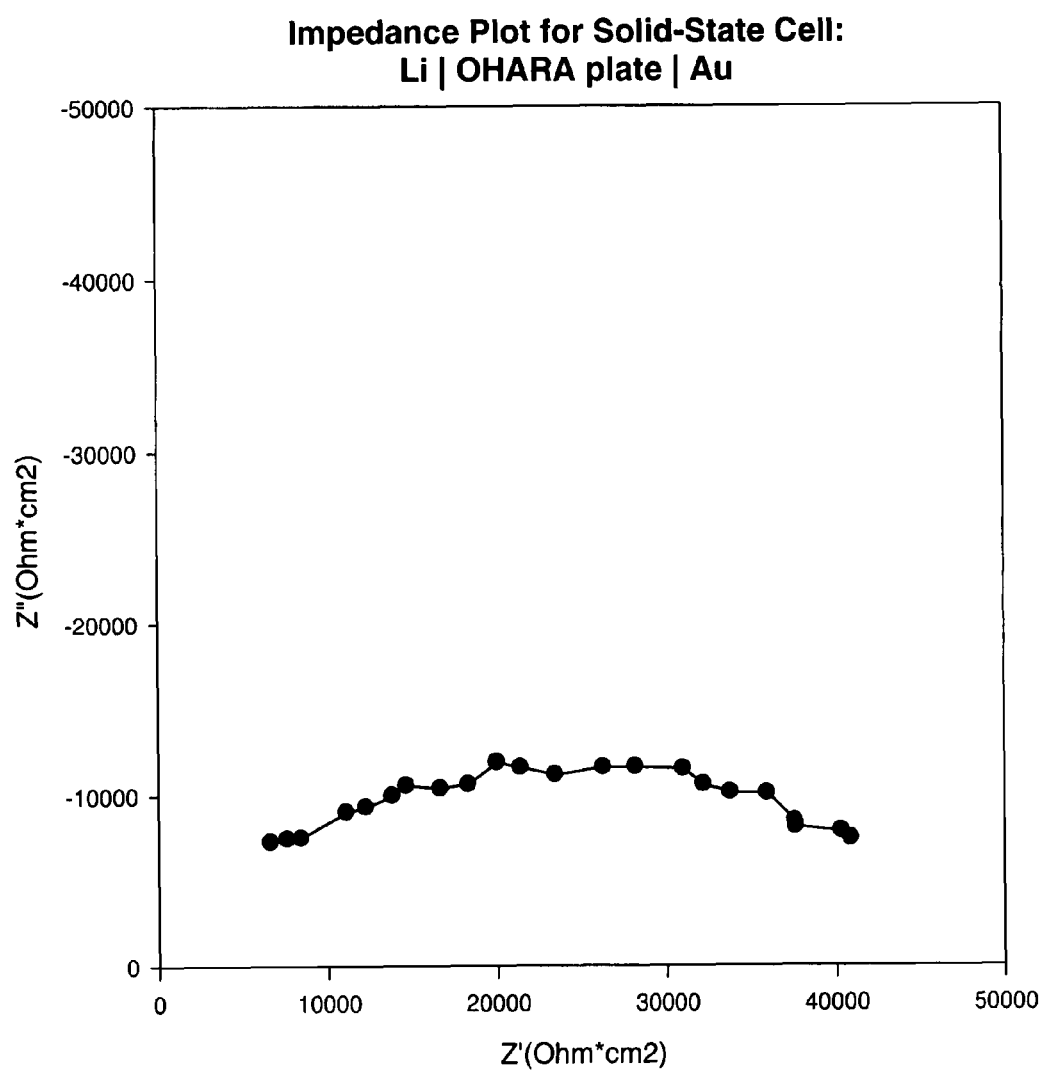
Figure 8B:
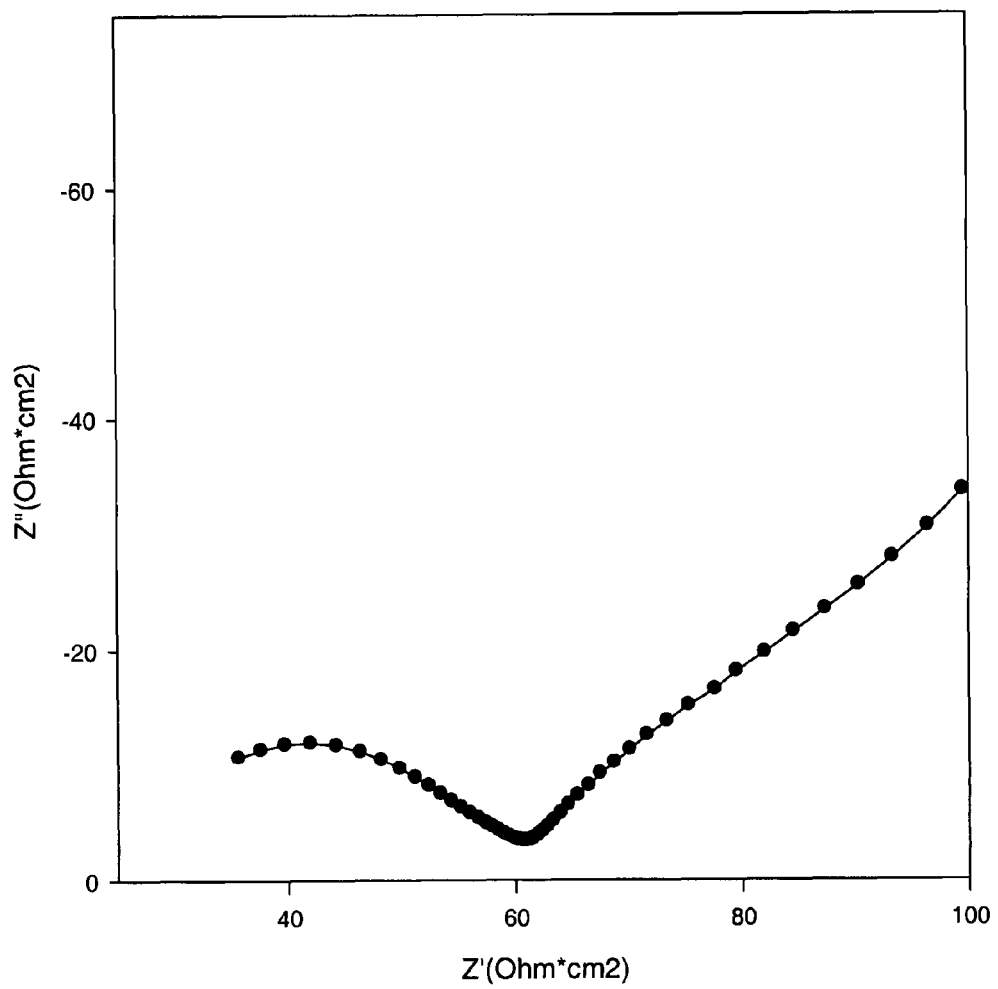
Figure 8C:
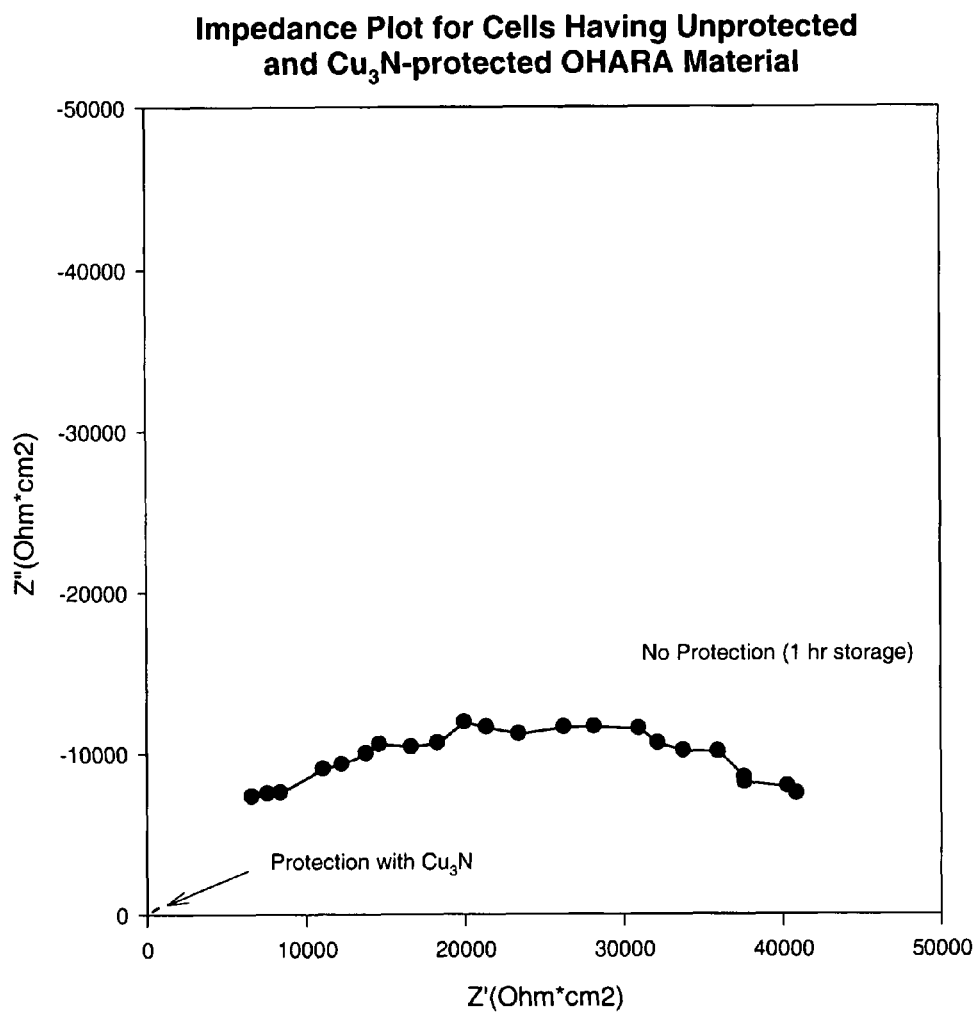
Figure 8D:
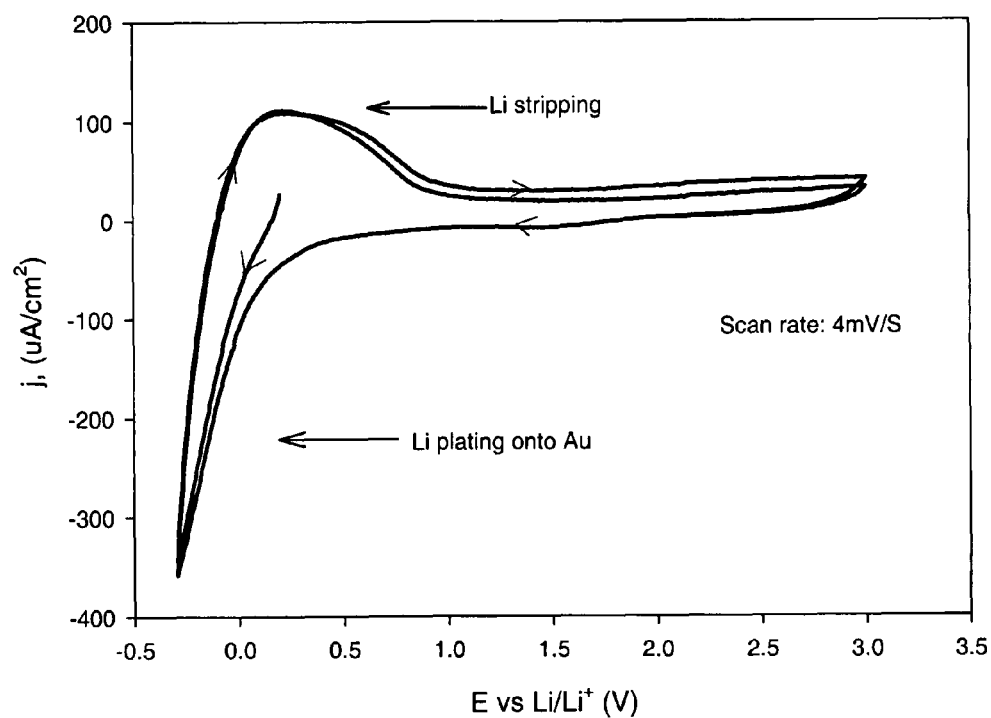

Impedance Measurements Using Glass-Ceramic Active Metal Ion Conductor (OHARA) in Composite Protective Layer Samples of Li$^+$ conductive glass-ceramic plates were received from OHARA Corporation. Approximately 3 to 7 microns of lithium was evaporated directly onto the OHARA glass-ceramic plate. The deleterious reaction of lithium with the electrolyte is seen in FIG. 8A; the impedance of the sample is quite large, approximately 40,000 Wcm$^2$. Onto a second sample of glass-ceramic plate was RF Magnetron sputter-deposited a film of Cu$_3$N (~0.9 microns thick), with subsequent evaporation of about 3 to 7 microns of lithium. The beneficial effect of the Cu$_3$N film can be seen in FIG. 8B; the impedance of the glass-ceramic is dramatically improved relative to the plate without the Cu$_3$N film. Superimposition of FIGS. 8A and 8B in FIG. 8C further illustrates the dramatic improvement in performance for the Cu$_3$N protected plate. The ionically conductive nature of the protective film is seen in 8D, where lithium is moved across the Li/Cu$_3$N/glass interface; this is presumably due to conversion of the ionically insulating Cu$_3$N film to highly conductive Li$_3$N+Cu.

CONCLUSION

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. An electrochemical device component, comprising:
an active metal electrode comprising an alkali metal or alkali metal alloy and having a first surface and a second surface;
a protective composite on the first surface of the electrode, the composite comprising,
a first material layer in contact with the electrode, the first material being ionically conductive to ions of the active metal and chemically compatible with the active metal, the first layer comprising a reaction product of the active metal with red phosphorous; and
a substantially impervious second material layer adjacent to and in active metal ion communication with the first layer, the second layer ionically conductive to ions of the active metal;
wherein the ionic conductivity of the composite is at least $10^{-7}$ S/cm.

2. The component of claim 1, wherein the first material layer is in contact and chemically compatible with the second material layer.

3. The component of claim 1, wherein the second material layer is reactive to the active metal electrode.

4. The component of claim 1, wherein the second material layer is polymer-free.

5. The component of claim 1, wherein the second material layer consists essentially of an inorganic solid electrolyte inherently ionically conductive to ions of the active metal.

6. The component of claim 5, wherein the inorganic solid electrolyte of said second layer has an active alkali metal ion conductivity of at least $10^{-5}$ S/cm.

7. The component of claim 6, wherein the active metal is Li.

8. The component of claim 7, wherein the second material layer is an inorganic solid electrolyte.

9. The component of claim 1, wherein the thickness of the first material layer is about 0.2 to 1 micron.

10. The component of claim 1, wherein the inorganic solid electrolyte of the second material layer is a ceramic.

11. The component of claim 10, wherein the inorganic solid electrolyte of the second material layer is selected from the group consisting of lithium beta alumina, LiSICON, sodium beta alumina and NaSICON.

12. The component of claim 10, wherein the inorganic solid electrolyte of the second material layer is a glass-ceramic.

13. The component of claim 7, wherein the inorganic solid electrolyte of the second material layer comprises an ion conductive glass-ceramic having the following composition:

| Composition | Mol % |
|---|---|
| $P_2O_5$ | 26-55% |
| $SiO_2$ | 0-15% |
| $GeO_2 + TiO_2$ in which | 25-50% |
| $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0<x \leq 0.4$ and $0<y \leq 0.6$, and where Q is Al or Ga.

14. The component of claim 10, wherein the inorganic solid electrolyte is a glassy or amorphous compound selected from the group consisting of phosphorous based glass, oxide based glass, sulfur based glass, oxide sulfur based glass, selenide based glass, gallium based glass, germanium based glass.

15. The component of claim 1, wherein the thickness of the second material layer thickness is about 0.1 to 1000 micron.

16. The component of claim 1, wherein the thickness of the second material layer thickness is about 0.25 to 1 micron.

17. The component of claim 1, wherein the ionic conductivity of the second material layer is between about $10^{-3}$ to $10^{-6}$ S/cm.

18. The component of claim 1, wherein the alkali metal comprises lithium.

19. The component of claim 18, wherein the first layer material comprises $Li_3P$.

* * * * *

UNITED STATES PATENT AND TRADEMARK OFFICE
CERTIFICATE OF CORRECTION

PATENT NO. : 7,858,223 B2
APPLICATION NO. : 11/824579
DATED : December 28, 2010
INVENTOR(S) : Visco et al.

Page 1 of 1

It is certified that error appears in the above-identified patent and that said Letters Patent is hereby corrected as shown below:

Column 1, line 9, change "now pending" to --now U.S. Patent No. 7,282,302--.

Column 1, line 12, change "now pending" to --now U.S. Patent No. 7,282,296--.

Column 12, line 9, change "DeJonge" to --De Jonghe--.

Column 12, line 26, add --now U.S. Patent No. 6,991,662, issues January 31, 2006--, after "filed Jul. 3, 2002".

Signed and Sealed this
Fourteenth Day of June, 2011

David J. Kappos
*Director of the United States Patent and Trademark Office*